United States Patent [19]

Harmand

[11] Patent Number: 5,590,466
[45] Date of Patent: Jan. 7, 1997

[54] METHOD FOR BORING OVERHEAD CAM ENGINE CYLINDER HEADS

[76] Inventor: Brice Harmand, 8604-H Via Mallorca, La Jolla, Calif. 92037

[21] Appl. No.: 414,507

[22] Filed: Mar. 31, 1995

Related U.S. Application Data

[63] Continuation-in-part of Ser. No. 301,244, Sep. 6, 1994.

[51] Int. Cl.$^6$ ........................................... B23P 15/00
[52] U.S. Cl. ........................ 29/888.011; 29/33 R
[58] Field of Search ................ 29/888.011, 560, 29/26 A, 33 R; 82/1.11; 408/75, 79; 407/165, 225, 227

[56] References Cited

U.S. PATENT DOCUMENTS

| 4,232,437 | 11/1980 | Fair ................................ | 29/888.011 |
| 4,967,458 | 11/1990 | Rosenberg et al. ................ | 29/888.011 |

FOREIGN PATENT DOCUMENTS

| 623253 | 12/1935 | Germany . | |
| 650985 | 10/1937 | Germany . | |
| 658575 | 4/1938 | Germany . | |
| 821580 | 11/1951 | Germany . | |
| 60169309 | 2/1987 | Japan ......................... | B23B 41/12 |
| 61-27523 | 8/1987 | Japan ......................... | B23B 41/12 |

OTHER PUBLICATIONS

Dura–Bond—Performance Racing Industry, Sep. 1994.
Acu–Bore—1994 Product Brochure.
Newen Genesys OHC Cylinder Head & Block Line Boring Machine—1995 Product Brochure.
Berco—1994 Product Catalog.
Sunnen Products Co.—1994 Product Brochure.
Serv–Equip, Inc.—Ad In Summer 1994 "Engine Rebuilder Trader" Magazine, p. 81.

*Primary Examiner*—Irene Cuda
*Attorney, Agent, or Firm*—Brown, Martin, Haller & McClain

[57] ABSTRACT

A method and machine for repairing overhead cam engine cylinder heads. The method includes the steps of removing the caps from the bases of the bearing towers or housings, removing material from the legs of the caps to reduce their height, replacing the caps on the bases, and boring the resulting bearings to produce bearings of the proper diameter. The machine includes a device for machining a bearing cap and a device for boring the bearings. The device for boring the bearings has a boring bar that is supported only at opposite ends of the cylinder head. The bar does not sag or chatter because it is made of an extremely hard and dense material such as a dense tungsten alloy or a ceramic-coated metal.

7 Claims, 4 Drawing Sheets

METHOD FOR BORING OVERHEAD CAM ENGINE CYLINDER HEADS

This is a continuation-in-part of co-pending application Ser. No. 08/301,244 filed Sep. 6, 1994.

BACKGROUND OF THE INVENTION

The present invention relates generally to devices for machining or rebuilding internal combustion engines and, more specifically, to devices for boring engine overhead camshaft cylinder heads.

The cylinder heads of overhead cam engines have bearings for supporting the camshaft. Each bearing is located in a tower that positions the camshaft relative to the cylinder head. The most commonly used type of bearing consists only of the interior surface of the tower. Typically, between two and seven bearings and corresponding towers are distributed along the length of the camshaft in the cylinder head. Each tower comprises a portion that is formed integrally with the remainder of the cylinder head. In a few types of cylinder heads, the entire tower is integrally formed with the cylinder head. Such a tower completely encircles the camshaft with the inner surface of the tower forming the bearing. However, in most types of cylinder heads, the tower is in two sections, the base portion of which is formed integrally with the cylinder head. The camshaft is supported between a semicircular bearing surface in the base portion and a corresponding semicircular bearing surface in the cap. The cap is secured to the base portion using two bolts.

The camshaft rotates smoothly so long as the bearings remain aligned along the camshaft axis of rotation. The cylinder head may, however, warp as a result of engine overheating. In every case, this warpage results in a concave deformation of the cylinder head. In addition, the bearings may wear over time as a result of use. Both cylinder head warping and bearing wear may cause the camshaft to vibrate and ultimately may prevent the camshaft from turning at all, or the camshaft bearings may wear so quickly and severely that the oil pressure drops, causing engine failure. Thus, it is apparent that when cylinder head warpage and bearing wear occurs, the camshaft bearings must be repaired in order to avoid costly repairs or engine replacement.

A line boring machine is a device having a table, a rotating steel boring spindle or boring bar, and a motor connected to the bar. The cylinder head is secured to the table, which functions as a reference plane. The boring bar is received horizontally through all the cylinder head bearings. The boring bar has mounting recesses distributed along its length for receiving cutting bits. In conventional boring bars, the mounting recesses are arranged along a common line parallel to the bar's axis. One bit is mounted adjacent each tower. The machine includes drive mechanisms for rotating the bar and moving the bar longitudinally along its axis of rotation. The bar is simultaneously rotated and fed longitudinally. Each cutting bit engages a bearing and removes metal to enlarge the bearing diameter. The cylinder head may then be removed from the machine. In order to provide the proper bearing diameter to meet OEM specifications, "repair bearings," which are annular inserts, usually made of steel, having an inside diameter equal to the proper diameter for the camshaft bearings and an outside diameter approximately equal to the diameter of the newly enlarged bearing, are inserted into the enlarged bearings and are retained by the resulting friction-fit. The camshaft may then be re-inserted through the repair bearings.

The use of repair bearings has several disadvantages. The friction-fit holding the repair bearings may loosen, allowing the repair bearings to rotate with respect to the cylinder head. Such rotation will quickly result in engine failure and require further repairs. In addition, heat conduction between the cylinder head, which is typically aluminum, and the steel repair bearings is poor and may prevent heat generated by the camshaft friction from dissipating properly into the cylinder head. The non-uniform heat distribution and the different coefficients of thermal expansion of the two metals increase the risk of loss of adhesion between the repair bearings and the cylinder head.

The use of the line boring machine described above to repair camshaft bearings creates a problem. The boring bar and its cutting bits must remain precisely axially aligned with the bearings during the process. In prior art line boring machines, the boring bar must be supported because the effect of gravity on the horizontal bar tends to sag or bow downward, thereby preventing it from boring along a perfectly straight axis.

Line boring machines attempt to minimize this problem by supporting the bar at multiple points along its length. The line boring machine includes multiple support arms that have bearings in which the bar rotates. When a cylinder head is mounted on the table of the machine, the arms extend between the towers. If the towers are spaced closely together, however, as is common in small engines, insufficient space exists between the towers to accommodate an arm. Moreover, both the distance between the arms and the distance between each arm and the table can be adjusted. It is therefore both time-consuming and difficult to obtain the required alignment among all of the arms.

Another solution that has been attempted involves supporting the boring bar by the two camshaft bearings at the extreme ends of the cylinder head. A bearing ring is inserted into each end bearing, and the boring bar is inserted through the bearing rings. This method is not effective, however, if the end bearings are themselves in poor alignment with each other. When this method is used, the end bearings tend to wear more quickly than the other bearings. Furthermore, the effectiveness of the method decreases with increasing cylinder head length.

These problems and deficiencies are clearly felt in the art and are solved by the present invention in the manner described below.

SUMMARY OF THE INVENTION

The present invention is an apparatus and method for repairing overhead cam engine cylinder heads. The method comprises the steps of removing the caps from the bases of the bearing towers or housings, removing material from the legs of the caps, replacing the caps on the bases, and boring the resulting bearings to produce bearings of the proper diameter. The apparatus comprises a device for machining a bearing cap and a device for boring the bearings.

Each bearing tower comprises a base and a cap. As originally manufactured, the bearing is defined by a semi-cylindrical surface inside the base and a corresponding semi-cylindrical surface inside the cap. When the cap is mounted on the base, the resulting bearing is cylindrical.

To remove a cap from its base, the bolts that extend downward through the legs of the cap are removed. The legs are then machined to remove a small amount of material to decrease the cap height. The present invention comprises a rotary cutting tool mounted on an axially movable carriage, a mounting block, and a suitable drive means such as an electric motor. The mounting block has two prongs or rods extending from it toward the cutting tool. To machine the legs of a cap, the rods are inserted into the bolt holes in the legs of the cap. The motor drives the cutting tool, which is advanced by a feed means such as a second electric motor, toward the bottom surfaces of the cap legs. When a sufficient amount of material has been removed from the cap legs, the cap is removed from the mounting and replaced on the tower base using the bolts.

When the cap is replaced on the tower base, the resulting bearing is asymmetrical because the portion of the bearing defined by the cap is no longer semi-cylindrical. The bearing is then bored to the diameter specified by the manufacturer, thereby restoring the cylindrical shape without requiring the insertion of repair bearings.

The present invention also comprises a line boring device that may be used for boring the bearings. The device has a boring bar that is supported for alignment with the drive motor by two half-shell inserts which are placed in the end bearings of the cylinder head. Once the proper height is determined, a pair of support stands, one at each end of the cylinder head, is adjusted in height to align the supports with the bar. Quick-release pillow blocks hold the boring bar onto the support stands so that the bar can rotate at the predetermined height. The height of the drive motor is adjusted to align it with respect to the boring bar supported by the half shells. The boring bar does not require support other than at its ends because it is made of an extremely stiff, hard and dense material, preferably a dense tungsten alloy such as DENAL™ or a ceramic-coated metal. The high density and/or ceramic coating minimizes vibration. The boring bar receives cutting bits at multiple locations along its length which are radially staggered, i.e., not in a linear arrangement. The device has a drive means, such as an electric motor, which is attached by a universal joint to the bar for rotating the bar. A feed means, such as a second electric motor, advances the bar in an axial direction, thereby engaging each cutting bit with one of the bearings. All bearings may thus be bored simultaneously.

The carbide cutting bits are configured with an adjustable collar ring to permit the appropriate depth of the blade to be pre-set before installation in the boring bar. All blades are set to the same depth and may be inserted into any of the mounting locations within the boring bar. All blades are set to the same depth and may be inserted into any of the mounting locations within the boring bar.

The foregoing, together with other features and advantages of the present invention, will become more apparent when referring to the following specification, claims, and accompanying drawings.

BRIEF DESCRIPTION OF THE DRAWINGS

For a more complete understanding of the present invention, reference is now made to the following detailed description of the embodiments illustrated in the accompanying drawings, wherein.

DESCRIPTION OF PREFERRED EMBODIMENTS

Figure 1:
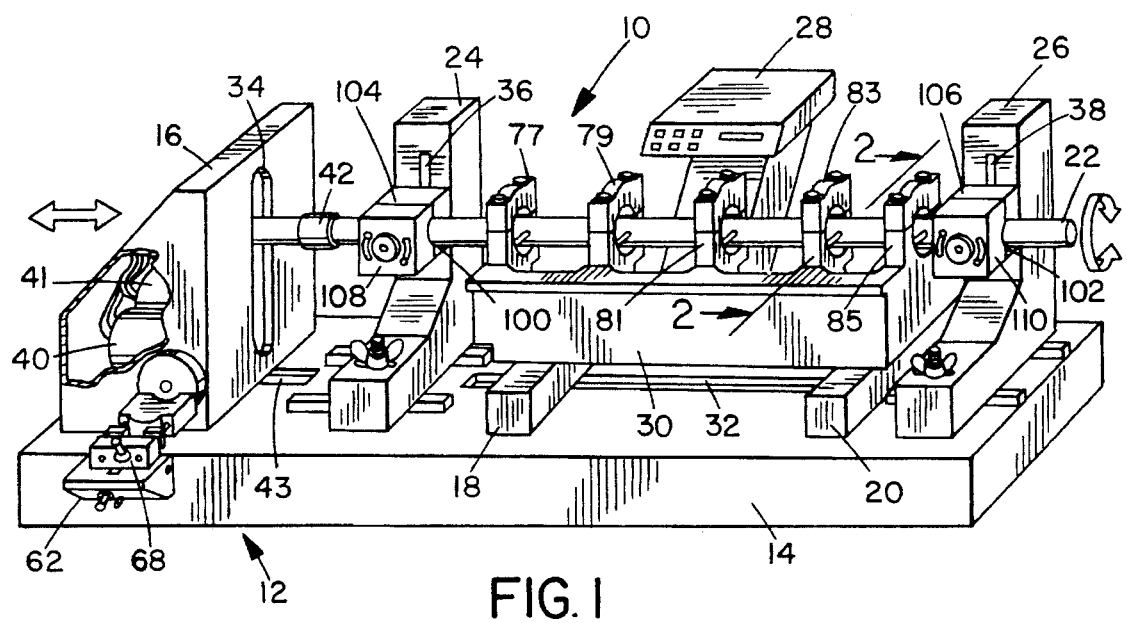
FIG. 1 is a perspective view of a machine for boring multiple axially aligned bearings and for machining bearing caps, showing an overhead cam engine cylinder head mounted on the boring device and a bearing cap mounted on the cap machining device.
Figure 3:
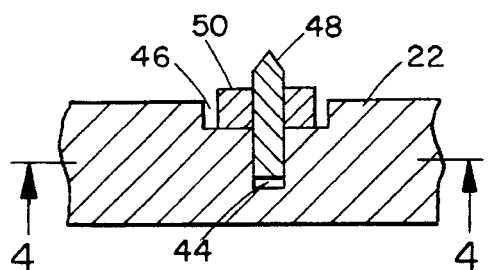
FIG. 3 is a sectional view of the boring bar taken on line 3—3 of FIG. 2.
Figure 4:
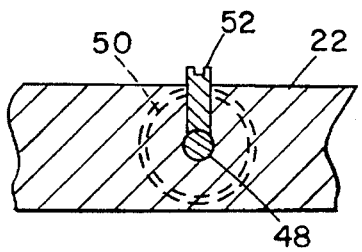
FIG. 4 is a sectional view of the boring bar taken on line 4—4 of FIG. 3.
Figure 2:
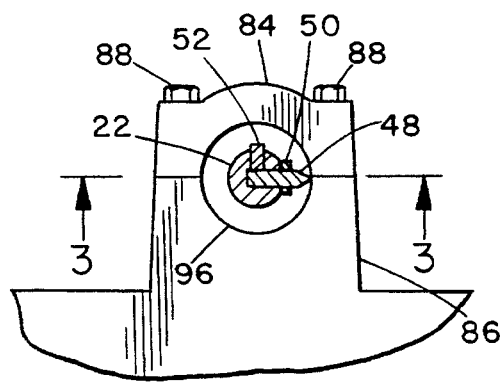
FIG. 2 is a sectional view taken on line 2—2 of FIG. 1.

As illustrated in FIG. 1, the present invention comprises a line boring machine 10 and a bearing cap machine 12. As described in further detail below, both machines 10 and 12 are powered by a common drive means.

Line boring machine 10 has a base 14, a drive housing 16, two workpiece mounts 18 and 20, a boring bar 22, two boring bar supports 24 and 26 and an electronic controller 28. A workpiece 30, such as an overhead cam engine cylinder head, may be mounted on workpiece mounts 18 and 20. A horizontal mount slot 32 that engages a portion of mounts 18 and 20 facilitates adjustment of the horizontal or axial position of mounts 18 and 20. Similarly, vertical bar slots 34, 36 and 38, in drive housing 16, support 24 and support 26, respectively, facilitate adjustment of the vertical position of boring bar 22.

Boring bar 22 is supported only by supports 24 and 26. Boring bar 22 is made of an extremely rigid and dense material, such as tungsten alloys having greater than 91% tungsten content. Typically the desired materials will have a modulus of elasticity on the order of 1.5 or more times that for a high strength steel. A preferred material is produced by the Cime Bocuze Company of Lyon, France under the trademark DENAL™. DENAL™ is a tungsten-nickel-iron alloy which increases in density and modulus of elasticity with increased tungsten content while showing little change in hardness. The preferred grade of DENAL™ has a density of between 17.6 and 18.5 g/cm$^3$, a hardness of between 300 and 490 Hv, and a modulus of elasticity of between 1000 and 1350 MPa (145,000 psi–197,750 PSI). The use of DENAL™ in the prior art is believed to be almost exclusively for armor penetrators in military ordnance. It has been determined in the present invention that the same properties of extreme rigidity and density that render DENAL™ useful for military ordnance are useful in boring bars for minimizing sagging and the resulting vibration. When made of such a material, boring bar 22 will sag no more than 0.02 mm between supports spaced approximately 90 cm apart. Another suitable material that minimizes vibration in a boring bar is steel coated with a ceramic material. The ceramic coating imparts a sufficient degree of hardness and rigidity to the steel that it approximates the properties of the DENAL™.

Figure 12:
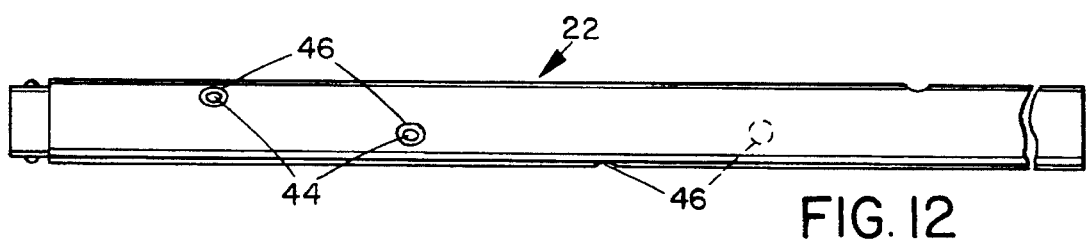
FIG. 12 is a side elevation of the boring bar.

The boring bar 22, illustrated in FIG. 12, has multiple mounting bores 44, each of which will accept one of the cutting bits 48. The spacing between the bores 44 is configured to match the spacing between the bearing towers of the cylinder head to be machined. In order to minimize torque on the boring bar, the bores 44 are staggered to distribute the torsional forces uniformly.

Figure 13:
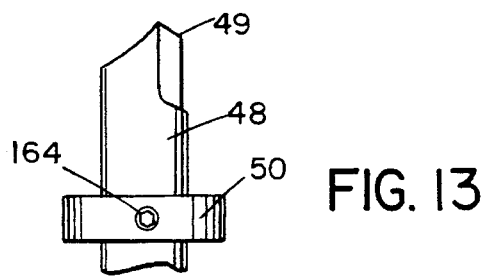
FIG. 13 is a side elevation of a cutting bit.

The cutting bits 48 are preferably carbide. The cutting edge 49, shown in detail in FIG. 13, is configured in an asymmetric paraboloid such that the rotational orientation of the cutting edge within the mounting bar is not critical and cutting can occur at any orientation of the bit.

Two electric motors 40 and 41 are disposed in drive housing 16. Motor 40 rotates boring bar 22 via a homokinetic coupling 42. Motor 40 may drive coupling 42 either directly or via suitable gearing (not shown) in drive housing 16. Motor 41 moves drive housing 16, which rides on a track or slot 43, in an axial or longitudinal direction. Boring bar 22 is, in turn, fed in the axial direction. Controller 28 controls these actions in response to commands entered by an operator. Controller 28 preferably maintains a rate of axial movement or feed rate that varies linearly with rotation speed. An operator may select a rotation speed, e.g., 600 RPM, and a feed distance per revolution, e.g., 0.02 mm per revolution. If the operator thereafter selects a different rotation speed, e.g., 400 RPM, controller 28 automatically adjusts the feed rate (from 12 mm/min. to 8 mm/min. in the present example) to maintain the selected feed distance per revolution. Persons of skill in the art will readily be capable of designing suitable electronics, including microprocessors and associated software or other computer components, to control motor speed and feed rate in the manner described above.

As illustrated in FIGS. 2–4 and 12, boring bar 22 has multiple cutting bit mounting bores 44 distributed along its length. Each mounting bore 44 has a countersunk recess 46 at its upper end. Recesses 46 function as reference planes because all are located at precisely the same distance from the axis of rotation of boring bar 22. A carbide-tipped cutting bit 48 is disposed in one of mounting bores 44 which has sufficient length (depth) to accommodate varied lengths of cutting bits. A collar 50, disposed around cutting bit 48, determines the distance that cutting bit 48 extends with respect to recess 46. A set screw 52 disposed in a threaded bore in boring rod 22 perpendicular to cutting bit 48 retains cutting bit 48 in rod 22.

Figure 5:
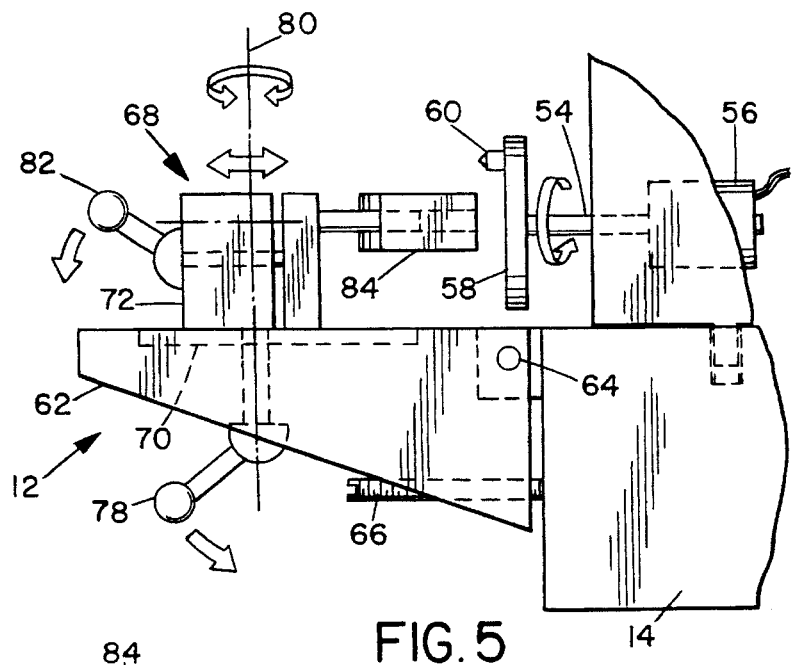
FIG. 5 is a side elevation view of the device for machining bearing caps.

FIG. 5 illustrates bearing cap machine 12 in further detail. A drive shaft 54 is rotated by a third motor 56. Controller 28 controls the rotation speed of drive shaft 54 in the manner described above with respect to boring bar 22. A cutting wheel 58 is connected to the end of drive shaft 54. A carbide-tipped cutting bit 60, mounted on cutting wheel 58 at a suitable radius, rotates with shaft 54. A "L"-shaped brace 62 is mounted to base 14 with a pivot pin 64. An adjusting screw 66 extends through a threaded bore below pivot pin 64 and contacts base 14. An operator may thus adjust the pivot angle of brace 62 with respect to base 14 by rotating adjusting screw 66.

Brace 62 can be mounted on tracks which permit lateral movement of the brace 62 with respect to the base 14. Alternatively, cap block 72 can be mounted on rails or tracks to permit lateral movement relative to brace 62.

A cap mount 68 on the upper surface of brace 62 slides toward and away from cutting wheel 58 along a track or slot 70. Cap mount 68 comprises a cap block 72 and two arms 74, each having a rod 76 extending therefrom toward cutting wheel 58. The distance between arms 74 is adjustable by sliding them apart or toward one another. Pivoting a handle 78 in the direction indicated by the arrow in FIG. 5 draws arms 74 toward cap block 72 and locks arms 74 in position at the selected separation distance. Similarly, the angular orientation of cap mount 68 with respect to a vertical axis 80 can also be adjusted by rotating cap mount 68 to a selected orientation and then pivoting a handle 82 in the direction indicated by the arrow in FIG. 5 to lock cap mount 68 down against the surface of brace 62.

Figure 6:
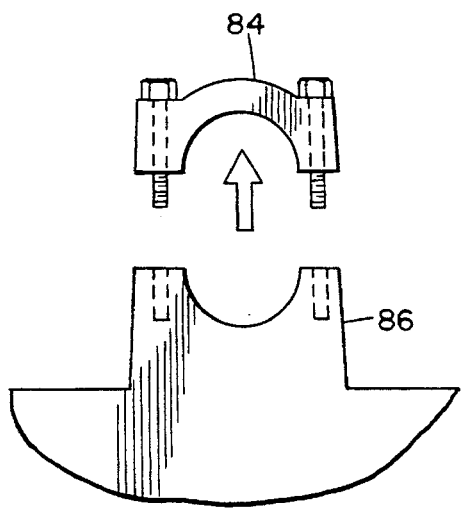
FIG. 6 is a side elevation view of a bearing tower, showing removal of the cap.
Figure 7:
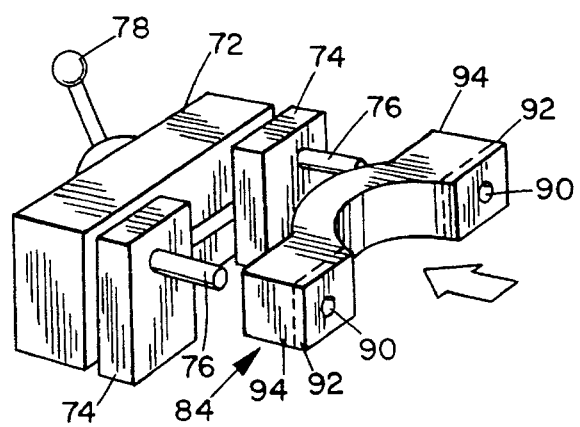
FIG. 7 is a perspective view of a portion of the device for machining bearing caps, showing a cap mounted on the device prior to machining the cap legs.

FIGS. 6–9 illustrate a method for repairing an overhead cam engine cylinder head using the apparatus described above. As illustrated in FIG. 6, a bearing cap 84 is removed from the base 86 of one of bearing housings or towers 77, 79, 81, 83 and 85 (FIG. 1) by removing two bolts 88. As illustrated in FIG. 7, cap 84 is mounted on cap mount 68 by inserting rods 76 into the bolt holes 90 of cap 84. The separation distance between rods 76 may be adjusted as described above to accommodate the dimensions of cap 84. It is important to assure that the bottom faces of the cap legs 94 are perpendicular to the cutting tool 58. This perpendicular alignment is facilitated by inserting the two rods 76 through bolt holes 90, making sure that the top of the cap is flush against the cap mount 68.

A thickness 92 of material is removed from each leg 94 of cap 84 using bearing cap machine 12. In response to commands entered by an operator, controller 28 starts motors 41 and 56. As described above, motor 41 advances drive housing 16. Cutting wheel 58, which is connected to drive housing 16 and is rotated by motor 56 inside drive housing 16, advances with drive housing 16. The rotating cutting bit 60 is thus moved into contact with legs 94 of cap 84 by the forward motion of drive housing 16. Controller 28 stops motors 41 and 56 in response to operator commands when machining of legs 94 is completed. Cap 84 is then removed from cap mount 68 and replaced on base 86 of the bearing tower using bolts 88. All of the bearing caps of the cylinder head are similarly machined in this manner.

If lateral movement is provided between brace 62 and base 14 or between cap block 72 and brace 62, the cap 84 can be slowly tracked radially across the cutting wheel 58 to assure the most uniform cut possible. During the cut, the cap 84 can be moved radially outward with respect to the cutting wheel 58, then moved back inward to assure uniformity. Using this technique, it takes approximately 40 seconds to machine one cap.

Figure 8:
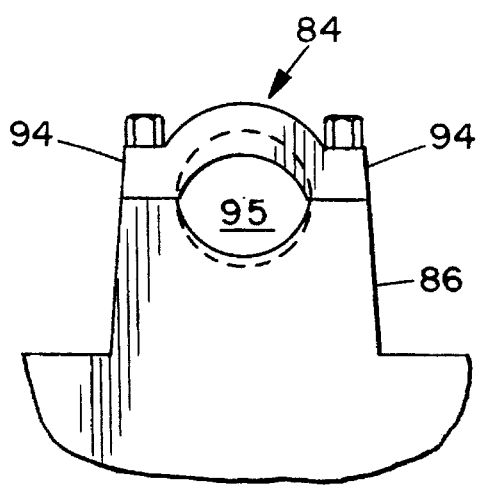
FIG. 8 is a side elevation view of a bearing tower, showing a cap re-mounted on the tower base following machining of the cap legs.

As illustrated in FIG. 8, the resulting bearing 95 is asymmetrical due to the reduced lengths of legs 94 and the arcuate bearing surface inside cap 84. (It should be noted that the figures are not drawn to scale, and the asymmetry is exaggerated for illustrative purposes.)

Line boring machine 10 may be used to bore bearing 95 as indicated in dashed line in FIG. 8. The cylinder head, i.e., workpiece 30, is loosely placed on workpiece mounts 18 and 20 of line boring machine 10. To aid aligning supports 24 and 26 with respect to boring bar 22, half-shell inserts 96, 97 shown in FIG. 2, may be inserted in the end bearing tower 85. Insert 96 has an outer diameter equal to that of the bearing and an inner diameter equal to that of boring bar 22.

Figure 14:
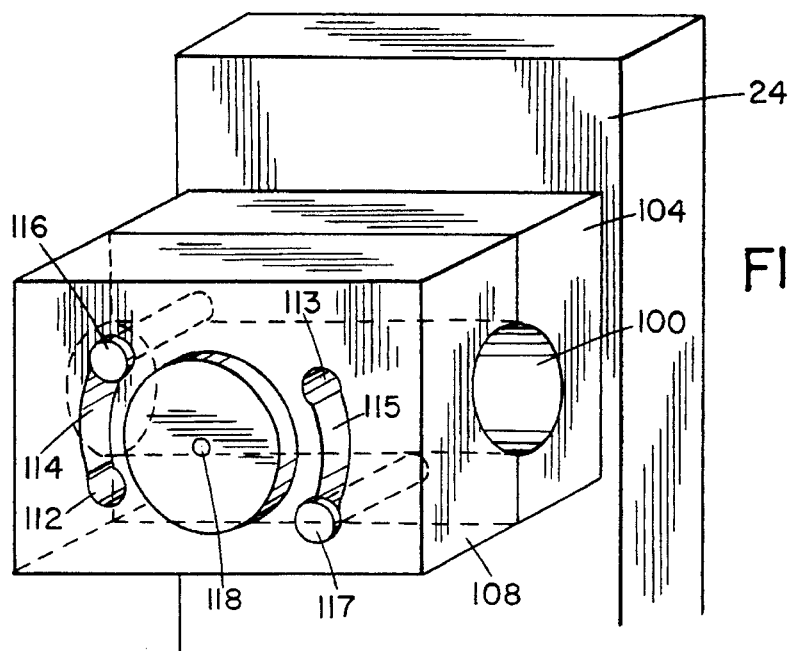
FIG. 14 is a perspective view of a pillow block.

With the half-shell inserts 96, 97 in place the supports 24, 26 are raised or lowered to align the boring bar 22 with respect to the corresponding channels 100, 102 in the inner halves 104, 106 of the pillow blocks which will rotatably retain the boring bar 22 during the machining process. Once aligned, the boring bar 22 is fixed in place by attaching the outer halves 108, 110 of the pillow blocks to the inner halves 104, 106. Providing more detail in FIG. 14, outer half 108 has a pair of bores 112, 113 which are connected to arcuate channels 114, 115. Pegs 116, 117 extend outward, perpendicular to the inside face of the inner half 104, and mate with bores 112, 113. The outer half 108 is rotated around center pin 118 to guide pegs 116, 117 into the channels 114, 115 until it locks into place. The cam configuration, along with needle pressure stops are used for quick attachment and to assure the correct pressure is applied to hold the bar in place while allowing bar 22 to rotate freely.

Figure 10:
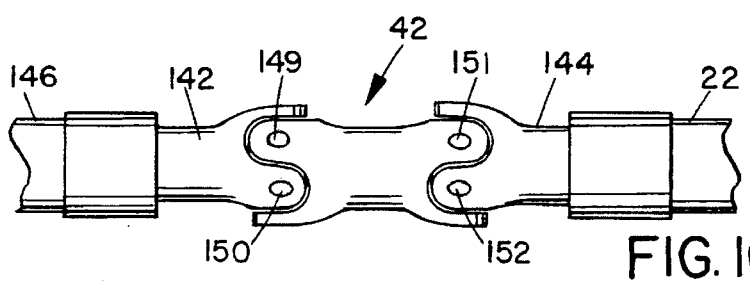
FIG. 10 is a side elevation of a universal joint for connecting the drive motor to the boring bar.

The supports 24, 26 are locked down the workpiece mounts 18 and 20 and the half-shells 96, 97 are removed. The top caps are remounted on each of the bearing towers 77, 79, 81, 83 and 85 and the nuts are torqued to OEM specifications. Inserts 96 are removed from beneath boring bar 22 after it has been aligned and supports 24 and 26 have been secured. The drive motor 41 is connected to the bar 22 by a universal joint 42 which is shown in detail in FIG. 10.

Universal joint 42 has ends 142 and 144 which mate with the ends of boring bar 22 and the drive shaft 146 of drive motor 40 respectively. Joint ends 142 and 144 are joined together to center segment 148 by pivot pins 149, 150, 151 and 152 to form a double homokinetic joint. This universal joint 42 permits a quick connection and also compensates concentricity differences of up to several millimeters between the bar 22 or drive motor 41, assuring that the bar 22 is fully centered during machining.

The drive motor 40 can be adjusted vertically to further align it with the boring bar 22. The vertical travel is controlled by linear ball bearing slides and linear ball bearing screws for a smooth feed.

Figure 11:
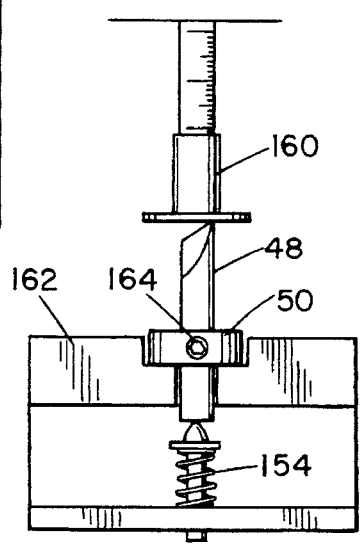
FIG. 11 is a diagrammatic view of the cutter depth adjustment mechanism.

The carbide cutting bits 48 are adjusted to machine the bearing caps to the OEM-specified diameter by placing the cutting bits 48, one-by-one, into the adjustment mechanism which may be built into the overall line boring system. The adjustment mechanism, shown in FIG. 11, comprises a micrometer 160 which is positioned in a fixed relationship to and above holder 162 in which is placed a cutting bit 48. The holder 162 has a spring 154 which pushes upward against the bottom of bit 48 to bias the top of bit 48 against the contact surface of the micrometer. Locking screw 164 is loosened to allow bit 48 to step within collar 50, so that collar 50 fits within the corresponding recessed area of holder 162. Spring 154 pushes the tip of bit 48 against the micrometer 160 which is adjusted as desired. Locking screw 164 is tightened to set the appropriate cutting depth and the cutting bit 48 is removed from the adjustment mechanism and dropped into any bit location in the boring bar 22.

Figure 9:
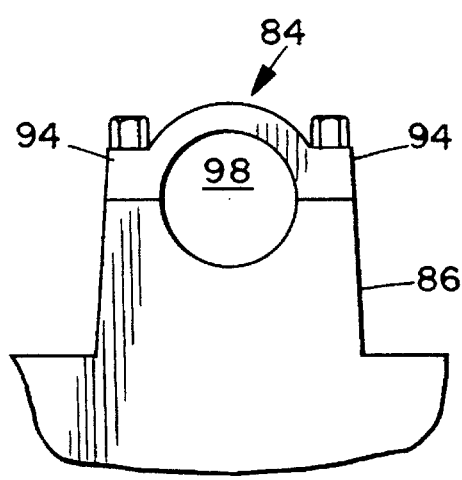
FIG. 9 is a side elevation view of the bearing tower of FIG. 8 following boring.

Cutting bits 48 are secured in mounting bores 44 by tightening locking screws 52. In response to commands entered by an operator, controller 28 starts motors 40 and 41. As described above, motor 40 rotates boring bar 22 and motor 41 advances drive housing 16 to feed boring bar 22 at the selected feed rate. In the preferred embodiment, the motor 40 is a d.c. motor with variable speed (−18–1800 rpm) and constant torque. Drive housing 16 has linear ball bearing slides and linear ball bearing screws to give a smooth feed. The feed may be automatically set in coordination with rotation speed or may be manual. Material is removed as cutting bits 48 contact the bearings. All bearings can thus be bored simultaneously, however, this arrangement also allows the bearings to be bored one at a time. Cutting bits 48 should be adjusted as described above to remove material to a depth that results in a bearing 98 having the diameter specified by the engine manufacturer, as illustrated in FIG. 9.

After the bearings have been machined the bearing caps are removed, the boring bar 22 is released from the pillow blocks and lifted away from the cylinder head. The cylinder head is released from the clamps and may be prepared for reassembly.

The novel method for repairing overhead cam engine cylinder heads is economical because it avoids the use of repair bearings. Moreover, it eliminates heat dissipation problems and other problems associated with the use of repair bearings. The present invention is also economical because the cutting tool feed for both line boring machine 10 and bearing cap machine 12 is provided by a common drive mechanism and because no intermediate supports are necessary to prevent sagging in boring bar 22. Furthermore, the present invention can be quickly and easily set up because there are no intermediate supports to align.

Obviously, other embodiments and modifications of the present invention will occur readily to those of ordinary skill in the art in view of these teachings. Therefore, this invention is to be limited only by the following claims, which include all such other embodiments and modifications when viewed in conjunction with the above specification and accompanying drawings.

What is claimed is:

1. A method for repairing an overhead cam cylinder head, said cylinder head having two ends and a plurality of bearing towers for retaining a camshaft along an axis, each said tower comprising a base portion and a cap, said cap having an upper bearing surface and two flange surfaces lying in a flange plane on either side of said upper bearing surface, each said flange surface having a bore, and said base portion having a lower bearing surface, the method comprising the steps of:

removing each cap from said cylinder head;

removing material from said flange surfaces of each cap;

disposing a boring bar having a plurality of cutting bits on said lower bearing surface of each said tower;

replacing each cap on said cylinder head; and boring each said tower along said axis to produce a cylindrical bearing surface.

2. The method for repairing an overhead cam cylinder head claimed in claim 1, wherein said step of disposing said boring bar comprises the steps of:

disposing a half-shell insert in said lower bearing surface of said tower at each end of said cylinder head;

resting said boring bar on the half-shell inserts;

supporting said boring bar at a height determined by said half-shell inserts so that said boring bar is fixed at said height;

attaching an end of said boring bar to at least one drive motor; and removing said half-shell inserts.

3. The method for repairing an overhead cam cylinder head claimed in claim 2, wherein the step of supporting said boring bar further comprises the step of:

rotatably retaining said boring bar within a pillow block attached to a support stand disposed at each end of said of said cylinder head.

4. The method for repairing an overhead cam cylinder head claimed in claim 2, wherein the step of attaching an end of said boring bar comprises the step of:

attaching a first end of a double homokinetic joint to said end of said boring bar and a second end of said double homokinetic joint to a drive shaft of said at least one drive motor.

5. The method for repairing an overhead cam cylinder head claimed in claim 1 wherein the step of boring comprises simultaneously rotating said boring rod about said axis and feeding said boring rod along said axis while said cutting bits engage said upper and lower bearing surfaces of said towers.

6. The method for repairing an overhead cam cylinder head claimed in claim 1 wherein the step of supporting said boring bar comprises rotatably retaining said boring bar in a pillow block mounted on a support stand at each end of said cylinder head.

7. The method for repairing an overhead cam cylinder head claimed in claim 1, wherein the step of disposing a boring bar further comprises mounting said plurality of cutting bits in said boring bar after pre-setting a cutting depth of each cutting bit of said plurality, the step of pre-setting comprising:

placing said cutting bit on support stage;

biasing said cutting bit against a micrometer;

adjusting an adjustable collar on said cutting bit so that said cutting bit extends a pre-selected distance above said support stage, said pre-selected distance being determined by an OEM-specified diameter of said cylindrical bearing surface.

\* \* \* \* \*